United States Patent
Cooper et al.

(10) Patent No.: US 7,236,629 B2
(45) Date of Patent: Jun. 26, 2007

(54) METHOD AND APPARATUS FOR DETECTING AND/OR TRACKING ONE OR MORE COLOUR REGIONS IN AN IMAGE OR SEQUENCE OF IMAGES

(75) Inventors: James Cooper, Betchworth (GB); Miroslaw Bober, Guildford (GB); Stavros Paschalakis, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 849 days.

(21) Appl. No.: 10/408,316

(22) Filed: Apr. 8, 2003

(65) Prior Publication Data
US 2004/0017938 A1  Jan. 29, 2004

(30) Foreign Application Priority Data
Apr. 18, 2002 (EP) .................................. 02252516

(51) Int. Cl.
*G06K 9/00* (2006.01)
*G06K 9/34* (2006.01)

(52) U.S. Cl. ...................... 382/171; 382/167; 382/172; 382/190; 358/518

(58) Field of Classification Search ........ 382/162–168, 382/171–172, 190, 272, 274, 276; 358/518–523, 358/1.9; 348/453
See application file for complete search history.

(56) References Cited

U.S. PATENT DOCUMENTS

| | | | |
|---|---|---|---|
| 4,975,960 A | 12/1990 | Petajan | |
| 5,280,530 A | 1/1994 | Trew et al. | |
| 5,430,809 A | 7/1995 | Tomitaka | |
| 5,751,926 A * | 5/1998 | Kasson et al. | 345/419 |
| 5,995,655 A * | 11/1999 | Lockett et al. | 382/162 |
| 6,028,960 A | 2/2000 | Graf et al. | |
| 6,148,092 A | 11/2000 | Qian | |

(Continued)

FOREIGN PATENT DOCUMENTS

EP 0899680 A2 8/1998

(Continued)

OTHER PUBLICATIONS

Fleck, M. Forsyth, D., Bregler, C., "Finding naked people", *In Proceedings of European Conference on Computer Vision ECCV'96*, 1996, vol. 2, pp. 593-602.

(Continued)

Primary Examiner—Matthew C. Bella
Assistant Examiner—Ali Bayat
(74) Attorney, Agent, or Firm—Birch, Stewart, Kolasch & Birch, LLP (57) ABSTRACT

A method of detecting a region having predetermined colour characteristics in an image comprises transforming colour values of pixels in the image from a first colour space to a second colour space, using the colour values in the second colour space to determine probability values expressing a match between pixels and the predetermined colour characteristics, where the probability values range over a multiplicity of values, using said probability values to identify pixels at least approximating to said predetermined colour characteristics, grouping pixels which at least approximate to said predetermined colour characteristics, and extracting information about each group, wherein pixels are weighted according to the respective multiplicity of probability values, and the weightings are used when grouping the pixels and/or when extracting information about a group.

36 Claims, 9 Drawing Sheets

U.S. PATENT DOCUMENTS

| | | | |
|---|---|---|---|
| 6,263,113 B1 | 7/2001 | Abdel-Mottaleb | |
| 6,292,575 B1 | 9/2001 | Bortolussi et al. | |
| 6,343,141 B1 | 1/2002 | Okada et al. | |
| 6,434,269 B1* | 8/2002 | Hamburg | 382/163 |
| 6,940,545 B1* | 9/2005 | Ray et al. | 348/222.1 |
| 7,035,456 B2* | 4/2006 | Lestideau | 382/164 |
| 7,082,211 B2* | 7/2006 | Simon et al. | 382/118 |
| 2002/0048399 A1* | 4/2002 | Lee et al. | 382/165 |

FOREIGN PATENT DOCUMENTS

| | | |
|---|---|---|
| EP | 1128316 A1 | 2/2001 |
| GB | 2357650 A | 6/2001 |

OTHER PUBLICATIONS

Soriano, M., Martinkauppi, B., Huovinen, S., Laaksonen, M., "Skin Detection in Video Under Changing Illumination Conditions", *In Proceedings of 15th International Conference on Pattern Recognition ICPR 2000*, vol. 1, pp. 1839-1842, 2000.

* cited by examiner

METHOD AND APPARATUS FOR DETECTING AND/OR TRACKING ONE OR MORE COLOUR REGIONS IN AN IMAGE OR SEQUENCE OF IMAGES

The invention relates to a method and apparatus for detecting and/or tracking one or more colour regions in an image. The invention is primarily concerned with the identification of skin colour regions such as face regions in an image. The invention is intended especially for use in mobile videophones, but can also be used in other applications such as security systems and teleconferencing systems. Our co-pending application, GB2357650, describes an example of a mobile videophone system which uses face detection and tracking.

There are various known approaches for detecting face regions in images. These include feature-based, motion-based and colour-based approaches. Feature-based approaches try to identify a face region by detecting certain facial features, such as the eyes, the nose and the mouth. Motion-based approaches operate on the principle that a moving region in an image is likely to be a face. A colour-based approach looks for skin-coloured regions in an image.

Many of the known face detection approaches are computationally expensive, and are thus not ideal for real time applications such as mobile videophones or teleconferencing. The preferred approach for such applications is a colour-based approach.

In simple terms, colour-based face detection involves extracting the regions of an image which have colour corresponding to skin colour. The face detection system should be able to detect a range of skin tones, such as African, Asian and European, and should also be able to detect skin colour irrespective of the lighting conditions under which the image is captured. Accordingly, many known colour-based face detection methods involve projecting the image pixel values from a first colour space, such as RGB, onto a second colour space, where the pixel values in the second space are less susceptible to variations in skin tones and lighting conditions. It is known that the hue-saturation, the normalised red-green and the logarithmic colour spaces produce good results in detecting different skin tones, and that some colour spaces, such as HSL, separate the lightness component from the colour information.

In U.S. Pat. No. 5,430,809 a method is presented whereby face detection and tracking is achieved through the detection of skin and hair areas. Skin detection is performed by comparing the hue value of each pixel with limits (thresholds) representative of the range of human skin, and hair detection is performed by comparing the lightness value of each pixel with limits (thresholds) that correspond to the lightness of human hair. Face detection is then performed by the examination of skin and hair pairs in conjunction with heuristic rules. A problem with this method is that the hue-based thresholding extracts a large range of colour values which can result in regions which are not skin but similar to skin being extracted as skin. A further problem with this method is that hair detection based on lightness makes the method sensitive to the colour of the hair of the person to be detected as well as sensitive to large changes in the illumination.

In U.S. Pat. No. 6,148,092 a method is presented whereby skin detection is achieved through the comparison of the normalised red and green values of the pixels in an image with predetermined ranges, expressed as rectangular or circular regions of the normalised red green plane. Then, face detection is achieved based on projections of the skin pixels onto the image axes. A drawback of this method is that it cannot be directly applied for the detection of multiple faces in an image.

In U.S. Pat. No. 6,343,141 face detection is achieved by first employing a shape locator. This shape locator identifies the edges of all the objects in the image and determines whether any edges approximate a predetermined shape which is considered to be representative of faces, namely elliptical. The pixels inside such shapes are then examined to determine whether they are skin based on whether they have signal energies characteristic of skin, using a DCT-based technique. If that is the case, the colour parameters, based on $C_r$ and $C_b$ colour values, of these pixels are then sampled to create a range of skin tones, and the whole image is searched for these skin tones to identify further skin regions. A drawback of this method is that the initial face localisation based on the shape locator is sensitive to viewpoint changes, e.g. profile views whereby the face may no longer be characterised by the predetermined shape.

In U.S. Pat. No. 6,263,113 another face detection method is presented. First, colour filtering is performed in order to identify skin pixels by comparing the values of the pixels in the image to ranges in the YUV colour space. Since this process gives rise to contiguous skin-like areas which may contain both skin and background areas, edge detection and removal is performed to fragment these areas until the fragmented areas appear face-like based on a set of heuristic rules. Also, since faces may also be represented by multiple skin-like fragments, area merging is also performed based on graphs in order to identify further face-like areas, based on a set of heuristic rules. Finally, further rules are applied to reduce the number of false positives. A drawback of this method is that the heuristic rules which are employed make a priori assumptions regarding the geometry of the face, such as its maximum size and its upright orientation.

Other face detection methods which do not rely on colour-based skin detection have been proposed. In U.S. Pat. No. 5,280,530 a method is proposed whereby object detection and tracking is based on global and local template matching in greyscale images and using a dynamically adapting template. A drawback of this method is that its success for face detection and tracking requires the cooperation of the person to be tracked for the formation of the initial template.

In U.S. Pat. No. 4,975,960 face detection and tracking is achieved through nostril detection and tracking in greyscale images. This method is presented with the ultimate goal of automated speech recognition, which implies suitable camera positioning, and will not be applicable in cases where the nostrils are not clearly visible due to camera distance or viewpoint.

In U.S. Pat. No. 6,028,960, a method for face detection and tracking based on nostril detection and utilising colour information is presented. The aforementioned drawbacks of U.S. Pat. No. 4,975,960 apply to this method also.

A paper titled "Finding Naked People" by Margaret M. Fleck et al. describes a system for finding skin within images by transforming the original colour values to a logarithmic colour space, feeding them to a skin filter, and also using a texture finding algorithm. If the detected skin occupies a region larger then a certain proportion of the image, shape analysis is carried out to see if the skin region is like a body part. The logarithmic colour space approach works fairly well for skin extraction but the texture analysis is computationally expensive and so is not particularly appropriate for real-time applications.

The paper "Skin detection in video under changing illumination conditions" by Soriano et al. discloses using a skin model histogram and assigning the values of the histogram to pixel values, followed by thresholding.

It is also desirable in some applications to track face regions between frames. This can be difficult when there are several face regions or skin-coloured regions in the images. It is also important to find the exact position and size of skin regions in certain applications, such as those where the face region is to be extracted for further processing, such as preferential encoding and display as in our co-pending application GB2357650 mentioned above.

Aspects of the invention are set out in the appended claims.

For example, the invention provides a method of detecting at least one region having predetermined colour characteristics in an image, the method comprising transforming colour values of pixels in the image from a first colour space to a second colour space;

using the colour values in the second colour space to determine probability values expressing a match between pixels and the predetermined colour characteristics, where the probability values range over a multiplicity of values;

using said probability values to identify pixels at least approximating to said predetermined colour characteristics;

grouping pixels which at least approximate to said predetermined colour characteristics;

and extracting information about each group, such as group size and/or group location, or power, i.e. the sum of the probabilities for pixels in the group;

wherein the grouping of pixels and/or extraction of information about a group involves using the multiplicity of different probability values. In other words, a multi-level probability map of the image is used in either grouping and/or deriving group information, without, for example, thresholding and binarisation of the probability values. This can greatly improve the performance.

In the following, where the specification refers to the term pixel, it does not necessarily mean the same pixel in each occurrence. For example, the term pixel may refer to a pixel in an original image, or a pixel derived from downsampling, or averaging, the original image, or a block of pixels, as appropriate.

As a result of the invention, specific colour regions such as face regions are identified together with information about their size and/or location, which can make tracking, extraction, and correlation of face regions simpler and more accurate, especially, for example, when there are several such regions, such as several faces, being tracked at the same time. The invention can also simplify features such as "zooming" on face regions.

Preferably, the image processing involves a downsampling phase or a simple segmentation process to reduce the processing complexity and make the method more suitable for small systems such as mobile devices.

The identification of colour regions preferably involves the transformation of the captured image from a first colour space to a second colour space and comparison with a colour model in a colour filtering stage. Preferably, the filtering stage can be tuned to an individual colour distribution, such as the skin colour of the person being filmed, using a calibration method. This makes the method more robust to other regions in the image of a similar colour, such as wood in the case of skin, for example. Preferably, the second colour space used is chosen for its properties in enhancing the colour or colour distribution sought.

Embodiments of the invention will be described with reference to the accompanying drawings of which.

An example of an application of the present invention is a mobile video phone communication system. Components of such a system are shown in block diagram form in FIG. 1. Generally speaking, the system is as described in our co-pending application GB 2357650 and extracts and tracks a face region in the sequence of captured images and encodes and transmits only the face region for display in a receiver.

Figure 1:
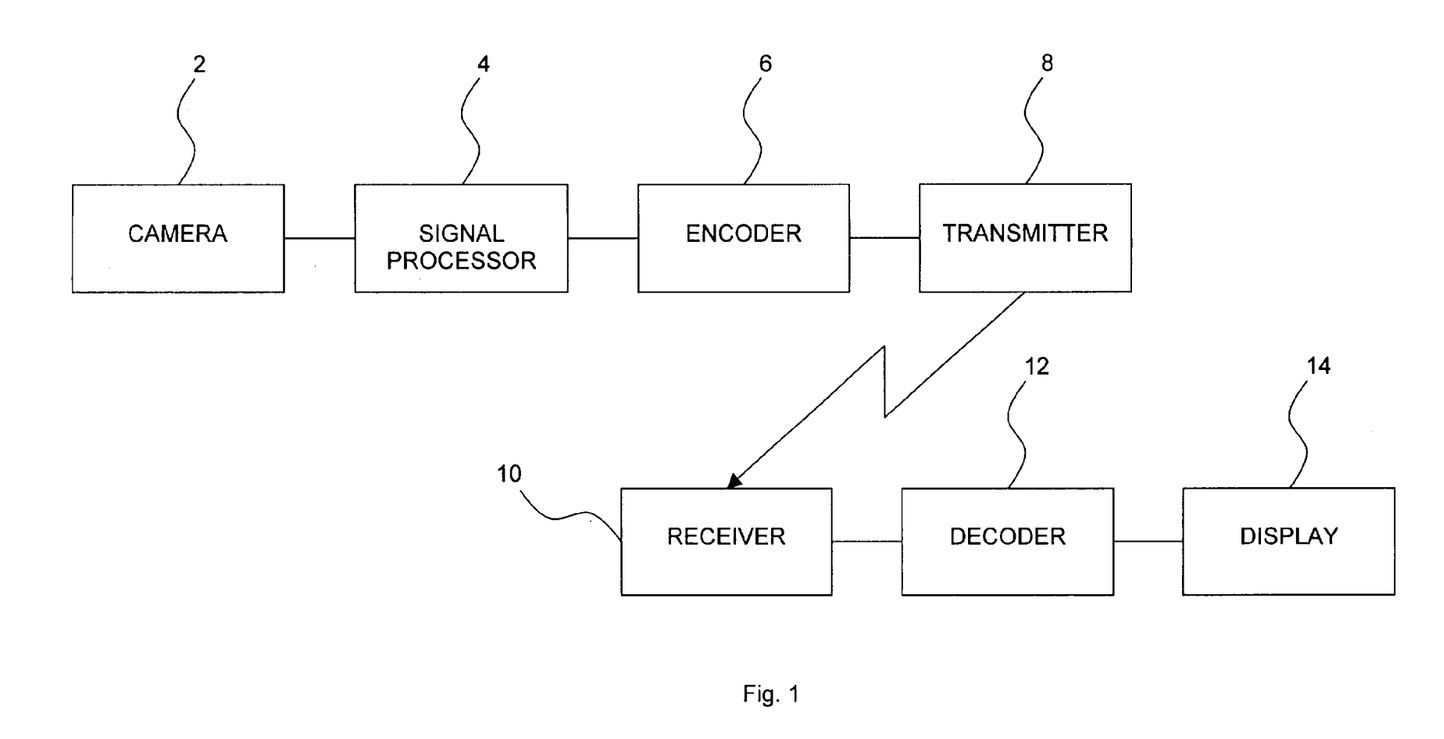
FIG. 1 is a block diagram of a mobile video communication system.

A mobile phone (not shown) includes a camera 2 for capturing images of the user. The camera 2 is a known type of camera for use in mobile video phones and is part of the phone handset. In an alternative embodiment, the camera is a separate component connected to the phone handset, for example, by a lead or by wireless communication. In this embodiment, the camera digitises images at CIF resolution (352×288 pixels).

The camera is connected to a signal processor 4 for processing signals received from the camera 2 representing the captured image. The signal processor 4 is shown in more detail in FIG. 2. The signal processor includes a face detection module 16, for detecting the size and position of the face or head in the captured image, a face tracking module 18, for tracking the face as it moves in the image, a frame region selection module 20, for selecting a specific region of the image, and a face region extraction module 22. The face detection module and face tracking module are described in more detail below. The signal processor 4 operates to select and extract a desired region of the image including the face region, as will be described in more detail below.

An output of the signal processor 4 is connected to an encoder 6, for encoding signals representing the extracted region of the image signal. The encoder is connected to a transmitter 8, for transmitting the coded signal in a known manner.

The receiving side of the system is a receiving terminal in the form of a second mobile phone (not shown). The second phone includes a receiver 10 for receiving the transmitted signal, a decoder 12 connected to the receiver for decoding the received signal, and a display 14 for displaying the received image in QCIF format.

Although not shown, the first mobile phone also includes components corresponding to the components of the receiving terminal, ie a receiver, decoder and display, and the second mobile phone also includes a camera, signal processor, encoded and transmitter as in the first mobile phone.

Figure 2:
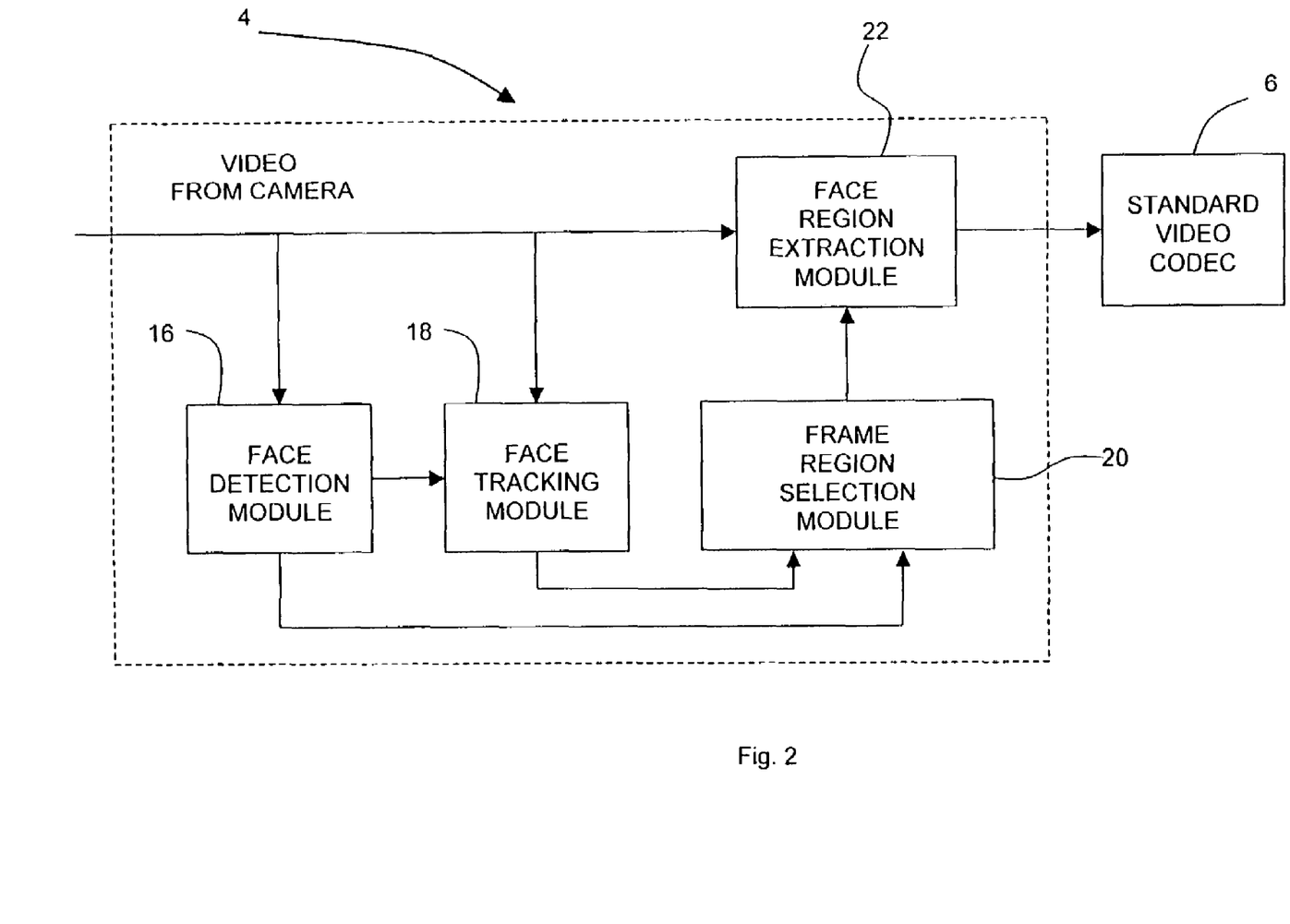
FIG. 2 is a block diagram showing the image processing circuit of FIG. 1 in more detail.

In operation, an image is captured by the camera 2, and the resulting signals are input to the signal processor 4. The image is analysed by the face detection module 16, which determines information such as the position and size of the face within the image.

Such information is input from the face detection module 16 to the face tracking module 18 and the frame region selection module 20, which determines the size and location of a window to be selected from the main image using information from both the face detection module 16 and the face tracking module 18. In this embodiment, the frame region selection module 20 is configured to select a window of a predetermined size centred on the face. More specifically, the region selection module selects a window having the same resolution as the display. Thus, in this case, the region selection module is configured to select a region sized 176×144 pixels, centred on the face region. The centre can be defined and determined in any suitable manner. In this embodiment, the centre of the face is the centroid of the flesh region.

The face region extraction module 22 receives signals from the camera and from the region selection circuit and extracts the window including the face region from the image from the camera. The extracted window is then transferred to the standard QCIF video coder 6 for coding using a suitable known coding method. The remainder of the image is discarded. These steps are performed for each frame of the captured video images.

The coded signal is transmitted, received and decoded by the receiving terminal, which displays the image of the face in QCIF format. Because of the process of selection of a region of the captured image which has the face in the middle of the region and which is of QCIF resolution, the displayed image has the face in the middle and is the correct resolution for the display. Also, the face is displayed as a higher fraction of the image than in the captured image, which gives the impression of better resolution. The coded data is transmitted to the second mobile phone, which receives, decodes and displays the window including the face region.

The present invention is primarily concerned with the face detection module 16 and the face tracking module 18, which will now be described in more detail.

First the operation of the face detection module 16 will be described. In the present embodiment, the module is implemented as a specifically programmed processor connected to a memory (not shown), but other implementations are possible. The method of operation will be described with reference to the flow diagrams shown in FIG. 3 and FIG. 4.

Figure 3:
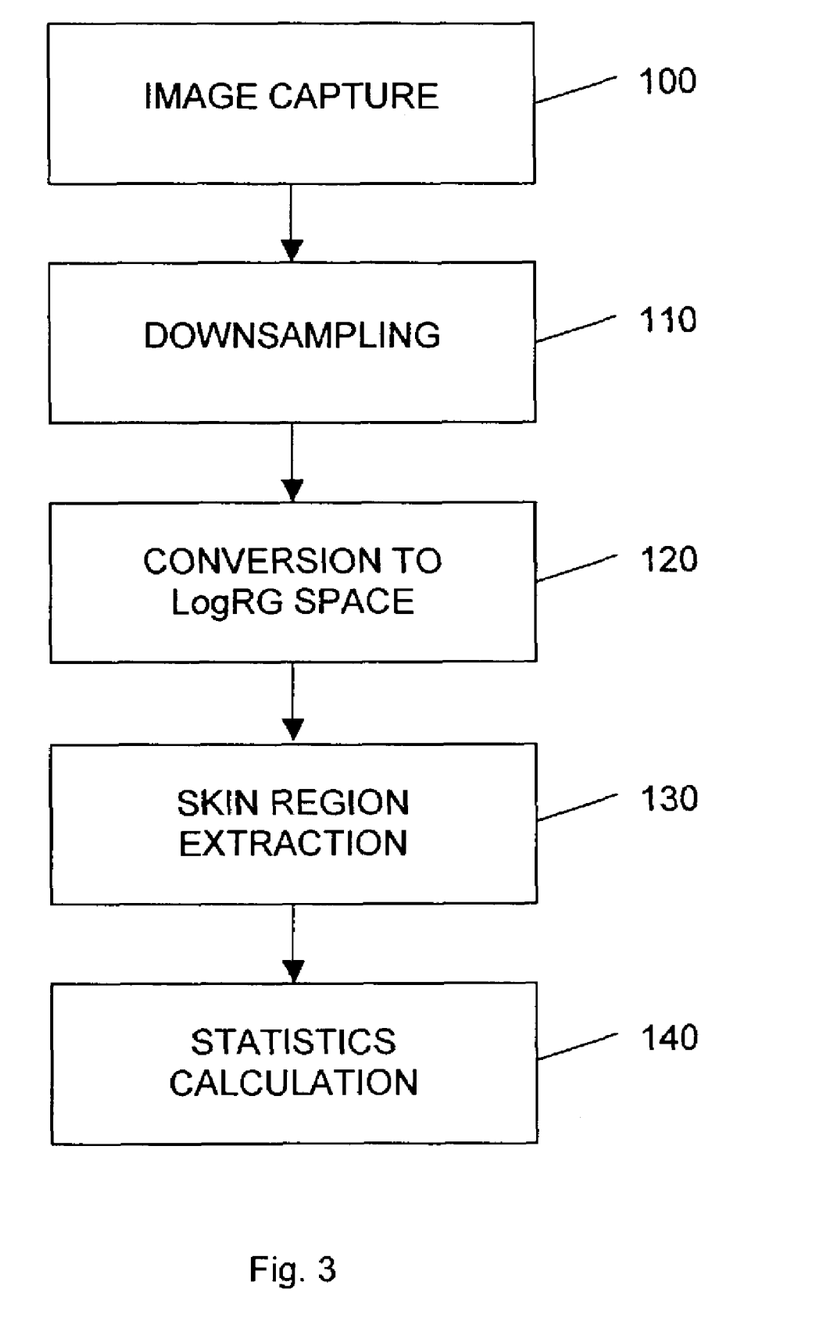
FIG. 3 is a flow diagram of a method according to an embodiment of the invention.

An image frame is captured by the camera 2 and sent to the face detection module 16 in RGB format (step 100). As a next step, step 110, the image frame is downsampled, to reduce the complexity of the processing. This is because the run-time complexity of the processing in the face-detection and face-tracking is directly related to the number of pixels processed. In many applications such as real-time systems and mobile technology such as mobile phones, it is especially desirable to keep complexity low. However, if complexity is not critical, the downsampling stage may be omitted. In such a case the term "downsampled image" refers to the original image, i.e. downsampling factor of 1. Furthermore, it should be understood that it is preferable for the downsampling step to be performed early in the processing of the image but not necessary. In other embodiments of this method, the downsampling step may be performed at subsequent points in the processing of the image, although this may adversely affect its effectiveness in reducing the complexity of the processing of the image.

There are various methods of downsampling to reduce the size of an image. Examples of downsampling include, but are not limited to, block averaging, interleaved averaging, inner block averaging and random pixel averaging. In each of those examples, first the frame is divided into blocks of predetermined size, such as 8×8, 16×16 or 32×32 pixels. Then, some or all of the pixel values in each block are averaged. Pictorial examples are shown in FIGS. 5A to 5E where the shaded pixels indicate the pixels which are averaged. In block averaging (see FIG. 5A) for each block, the colour value of each pixel within the block is summed and divided by the number of pixels in the block to produce an average value for the block. In interleaved averaging (FIG. 5B and FIG. 5C), pixels in alternate rows or columns are averaged. In inner block averaging (FIG. 5D), a smaller block within a larger block, such as a 16×16 block within a 32×32 block, is averaged. In random pixel averaging (FIG. 5E), a predetermined number of randomly selected pixels of the block are averaged. Alternatively, the image downsampling may be also achieved as described above but through the calculation of median pixel values instead of average pixel values.

Next, the face detection module 16 operates on the downsampled image by projecting its colour values from the colour space in which the image is captured onto a second colour space, which is chosen because it gives good results in detecting skin colours, while being robust to variations in skin tone and the lighting conditions under which the image is captured.

The preferred second colour space in this embodiment is the logarithmic RGB colour space. The transformation formulae from RGB to logarithmic RGB are as follows:

$L_1 = \log(\text{Green}+1)$ $L_2 = \log(\text{Red}+1) - \log(\text{Green}+1)$ $L_3 = \log(\text{Blue}+1) - (\log(\text{Green}+1) + \log(\text{Red}+1))/2$ In this invention, the $L_3$ component is not used because skin tones only contain a small amount of blue colour. Other colour spaces which produce good results when used as the second colour space include normalised RGB and HSL colour spaces.

Thus, in step 120, the RGB values of the pixels in the downsampled image are converted in $L_1$ and $L_2$ values using the formulae above. In the following, this second colour space will be described as LogRG space. The colour values in LogRG space are then fed to the skin region extraction module 130 where the first step is their projection onto a LogRG skin probability model in order to determine for each pixel the probability it belongs to a skin region. The internal architecture of said skin region extraction module 130 is shown in FIG. 4 and will now be examined more closely.

Figure 6A:
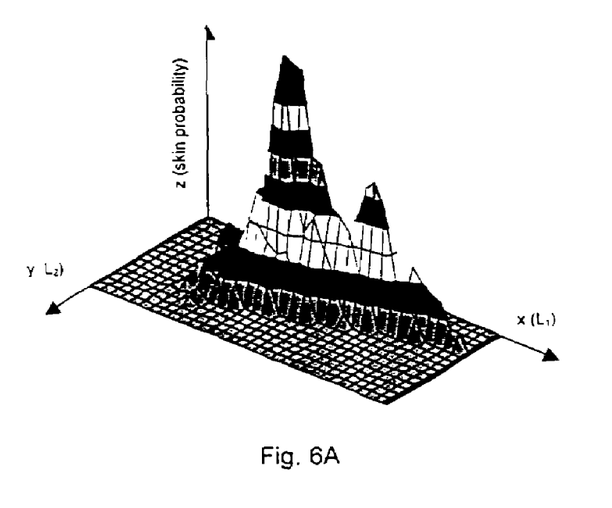
FIGS. 6A and 6B show examples of a LogRG skin probability model.
Figure 6B:
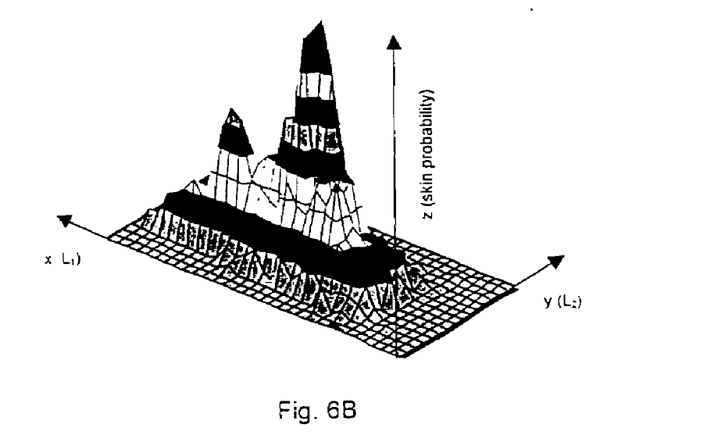

The aforementioned LogRG skin probability model is stored in a memory in the face detection module and contains the probabilities that values in LogRG space correspond to skin colour. The skin probability model is prepared by taking a large set of training skin regions covering as large a range of skin tones as possible and under as wide a range of illuminations as possible. Each pixel value in the skin region is converted into a value in LogRG space and a histogram is built in LogRG space by counting the number of occurrences of each LogRG value. Preferably, the values of this histogram are standardised to a given range, e.g. 0 to 1. Preferably, the histogram is also filtered, e.g. with a median or mean filter, for the purpose of smoothing and the elimination of high frequency components. Also, in this embodiment, only a small relevant portion of the entire LogRG histogram is retained to give rise to the LogRG skin probability model, with values not belonging to this portion automatically acquiring the lowest skin probability value, e.g. 0, thus reducing the complexity and storage requirements of the implementation. Optionally, in other embodiments, multiple portions of the LogRG space may be retained as required for the creation of the skin probability model. The LogRG skin probability model derived in this way gives an indication of the probability that a LogRG colour value corresponds to a skin region. An example of a LogRG skin probability model is shown in FIGS. 6A and 6B. Points on the x and y axes correspond to points in LogRG space, while points on the z axis correspond to skin probabilities. The higher the z axis value for a given LogRG point, the higher the probability that that particular colour is a skin colour.

Figure 4:
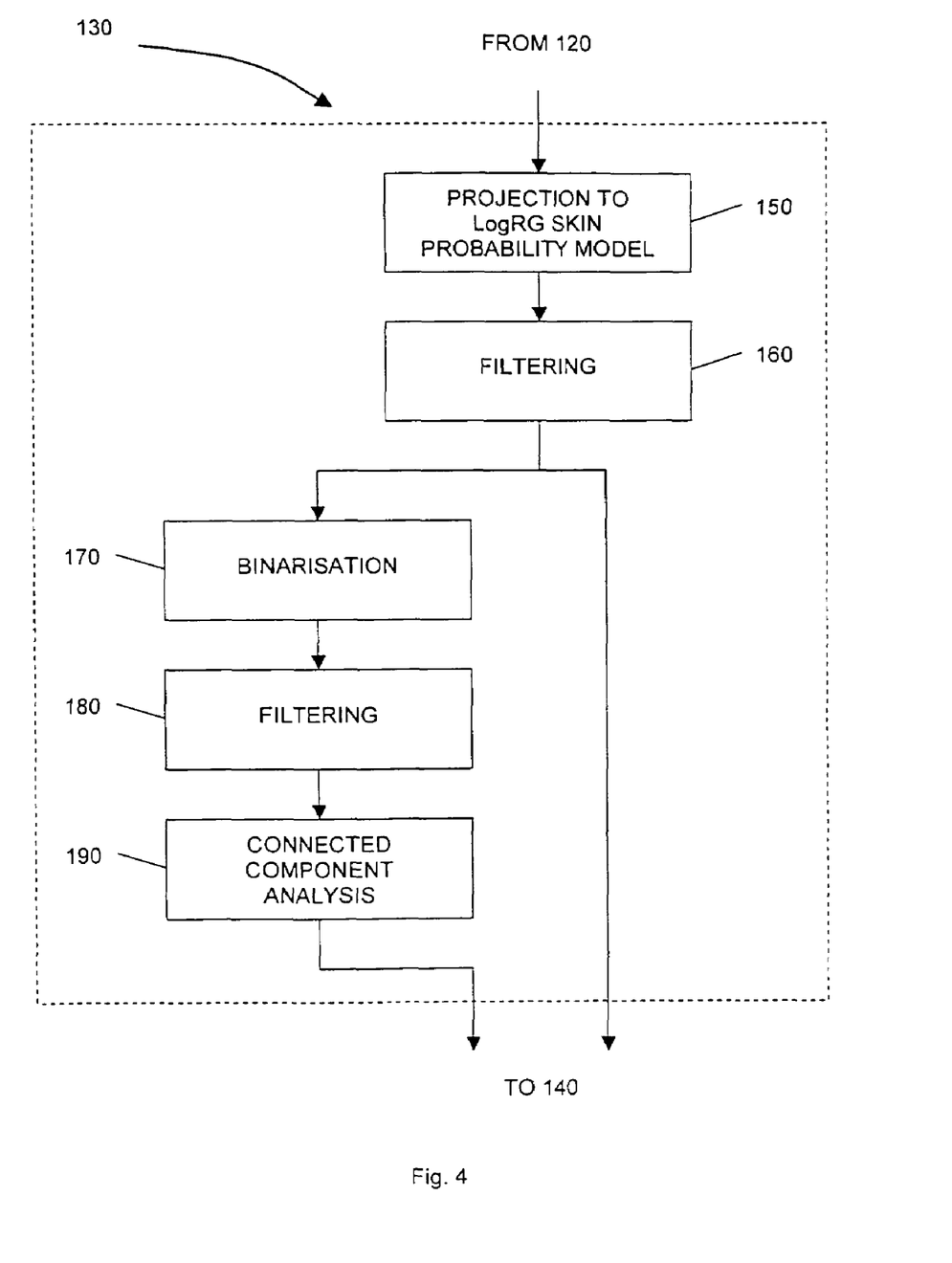
FIG. 4 is a flow diagram showing the skin region extraction step of FIG. 3 in more detail.
Figure 5A:
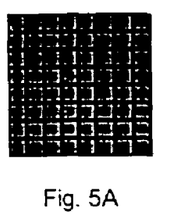
FIGS. 5A to 5E depict methods of downsampling images.
Figure 5B:
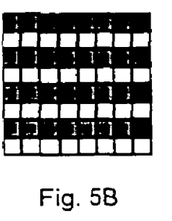
Figure 5C:
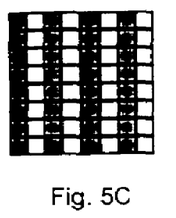
Figure 5D:
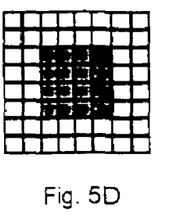
Figure 5E:
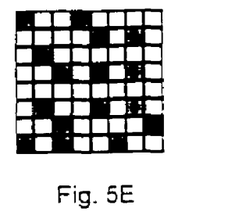
Figure 7:
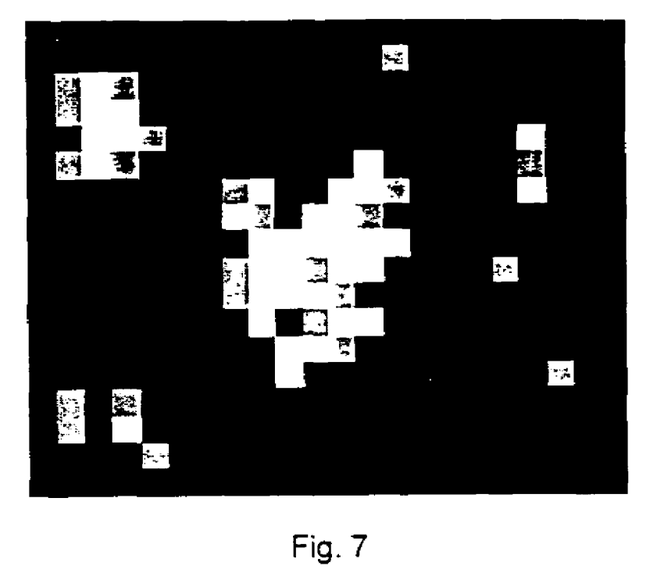
FIG. 7 shows an example of a multi-level skin probability map.

Thus, in step 150 of FIG. 4, for each pixel in the downsampled image the LogRG values are projected onto the skin probability model to obtain a value indicating the probability that the pixel value corresponds to a skin colour. The result of this operation for all the pixels of the downsampled image is known as a skin probability map. An example of a skin probability map is shown in FIG. 7. The tone of each pixel represents the probability that it corresponds to a skin colour, and the lighter the pixel, the greater that probability. For clarity, FIG. 7 indicates only a few tonal values whereas usually there will be more values. Using a multi-level skin probability map instead of relying solely on a binary skin/non-skin map, in combination with subsequent filtering and grouping, greatly enhances the performance of the system.

The LogRG skin probability model can be calibrated to a specific user. For example, the user of the first mobile phone can calibrate the skin-probability model so that it is adapted to the skin colour of said user to improve the performance. This can be done by putting the system into a calibration mode. Then the user focuses the camera 2 on only a skin region, or manually extracts a skin region from a captured image, and the processor 4 produces a new LogRG skin probability model. The old model is then merged with the new model, e.g. by averaging or weighted averaging, adjusting the importance of the new model relative to the old model. Alternatively, the model obtained from the user can be used on its own.

Figure 8:
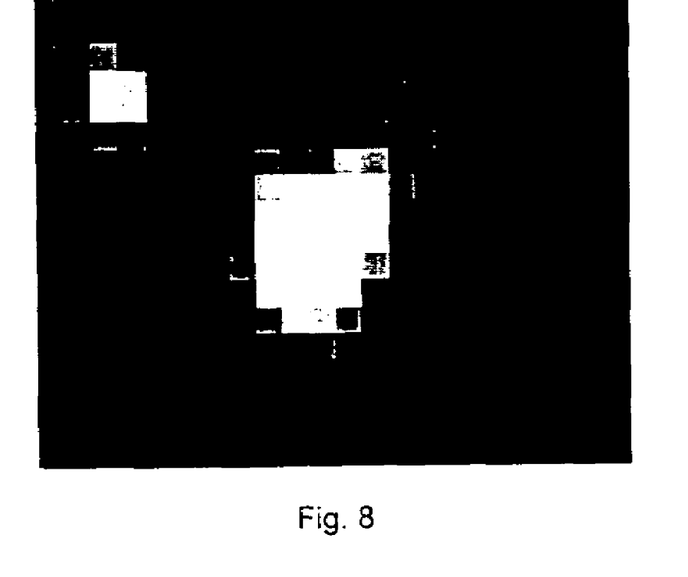
FIG. 8 shows the multi-level skin probability map of FIG. 7 after filtering.

Preferably, the next step in the method is the filtering of the skin probability map for the purpose of smoothing. This step, step 160 in FIG. 4, is desirable especially when the original frame is downsampled by a large factor, which may give rise to a coarse skin probability map. This filtering can be achieved by employing a filter such as a mean or a median filter, whereby each pixel neighbourhood of a given size, e.g. 3×3, is examined and the central pixel is replaced by the mean or median of all the pixels in the neighbourhood respectively. The result of this step will be referred to as a smoothed skin probability map. As an example, the result of mean filtering with a 3×3 neighbourhood mask on the skin probability map of FIG. 7 is shown in FIG. 8.

While the smoothed skin probability map is retained for further processing, this map is also thresholded to produce a binary skin probability map, in order to eliminate skin pixels with low skin probabilities and also facilitate the subsequent processing in the method. In other words, in step 170, the value of each pixel in the smoothed skin probability map is compared to a fixed threshold, e.g. 0.25. If the value is lower than the threshold, the pixel is assigned the minimum skin probability value, e.g. 0, otherwise it is assigned the maximum skin probability value, e.g. 1. As an example, the result of this step performed on the smoothed skin probability map of FIG. 8 and using the threshold value mentioned above is shown in FIG. 9.

Figure 9:
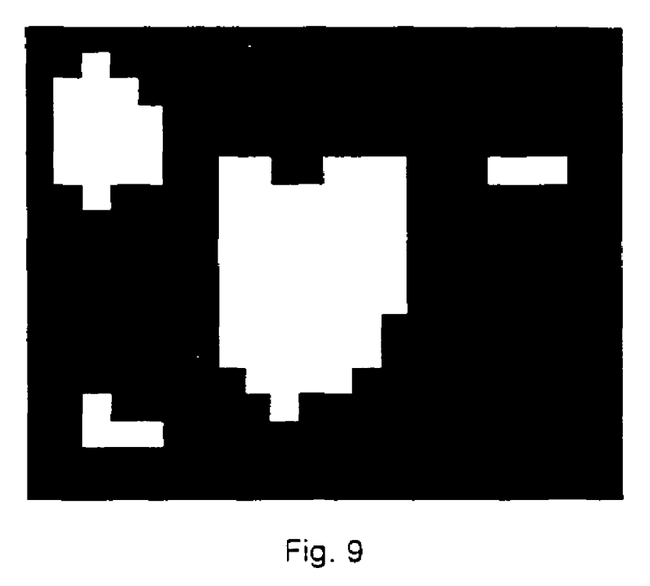
FIG. 9 shows the filtered map of FIG. 8 after binarisation.
Figure 10:
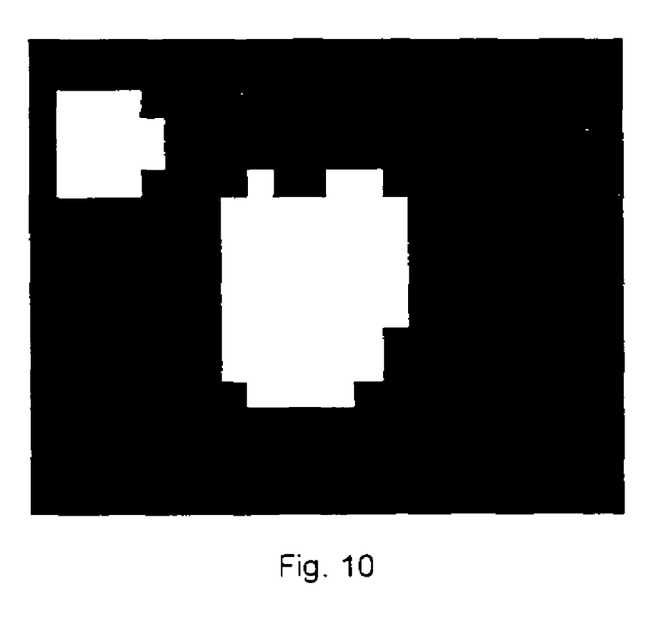
FIG. 10 shows the binary map of FIG. 9 after filtering.

The next step, step 180, is the spatial filtering of the binary skin probability map in order to eliminate noise, i.e. small isolated skin pixel regions. This filtering involves converting skin pixels to non-skin pixels and/or non-skin pixels to skin pixels by virtue of their arrangements relative to other pixels. In this example, this filtering is performed by converting to a non-skin pixel any skin pixel in the probability map that has less than four skin pixels among its eight neighbours and converting to a skin pixel any non-skin pixel that has more than seven skin pixels among its eight neighbours. In other embodiments of the method, different values may be used. The result of this operation will be referred to as a filtered binary skin probability map. As an example, the result of this filtering operation on the binary skin probability map of FIG. 9 is shown in FIG. 10.

Figure 11A:
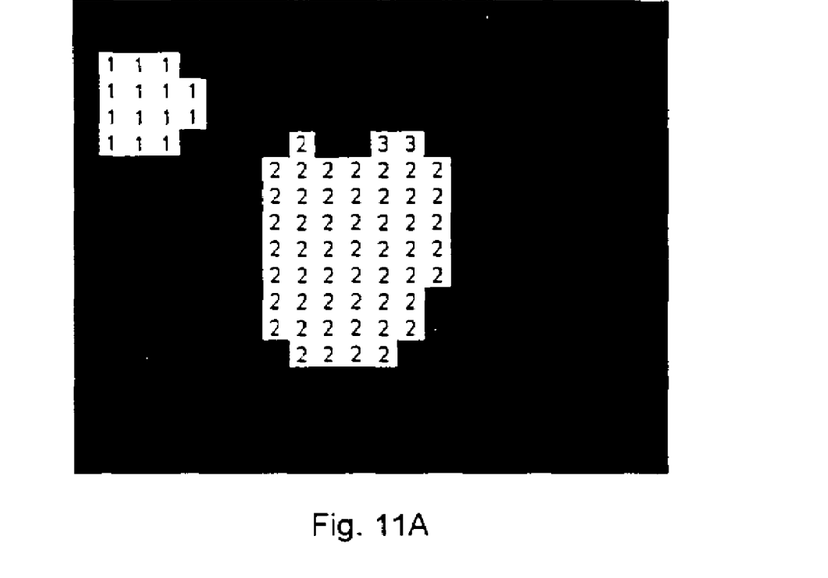
FIGS. 11A and 11B show an example of connected component analysis on the binary map of FIG. 10 for the creation of a skin region map.
Figure 11B:
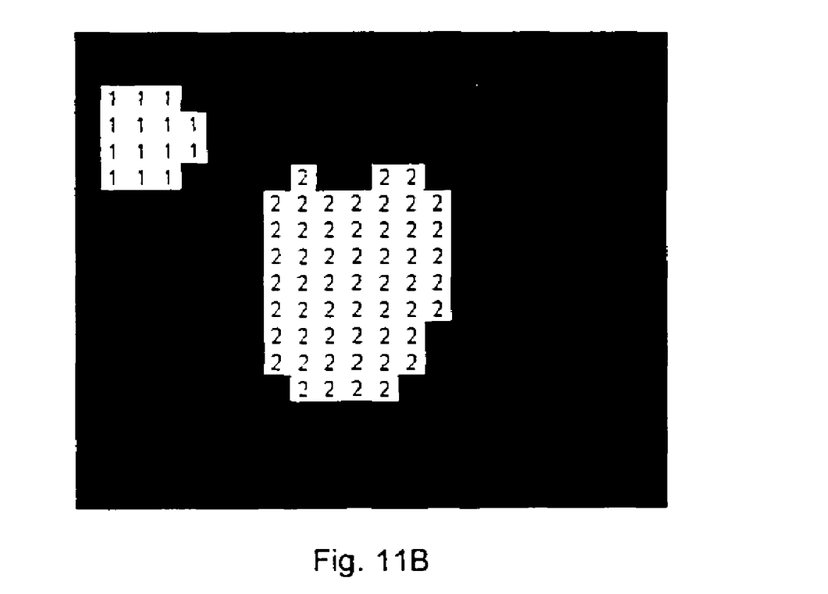

The filtered binary skin probability map may include one or more groups of connected pixels of skin region. The next step, step 190 in FIG. 4, involves connected component analysis, i.e. labelling and grouping the skin pixels in the filtered binary skin probability map. In the embodiment, this is done by parsing the pixels from top-left to bottom right. Each skin pixel is labelled with a group number. If a skin pixel neighbours a skin pixel with a group number, then the skin pixel is given the same group number. If the skin pixel neighbours more than one skin pixel with a group number, the skin pixel takes the lowest of those group numbers, and the other skin pixels also take the lowest group number. This may be done in a second parse. The result of this operation will be referred to as a skin region map. As an example of this operation, FIG. 11A shows the result of the first parse on the filtered binary skin probability map of FIG. 10, which results in three groups, identified by the numbers 1 to 3. Then, FIG. 11B shows the result of the second parse on the map of FIG. 11, where two adjoining groups are merged.

Figure 12:
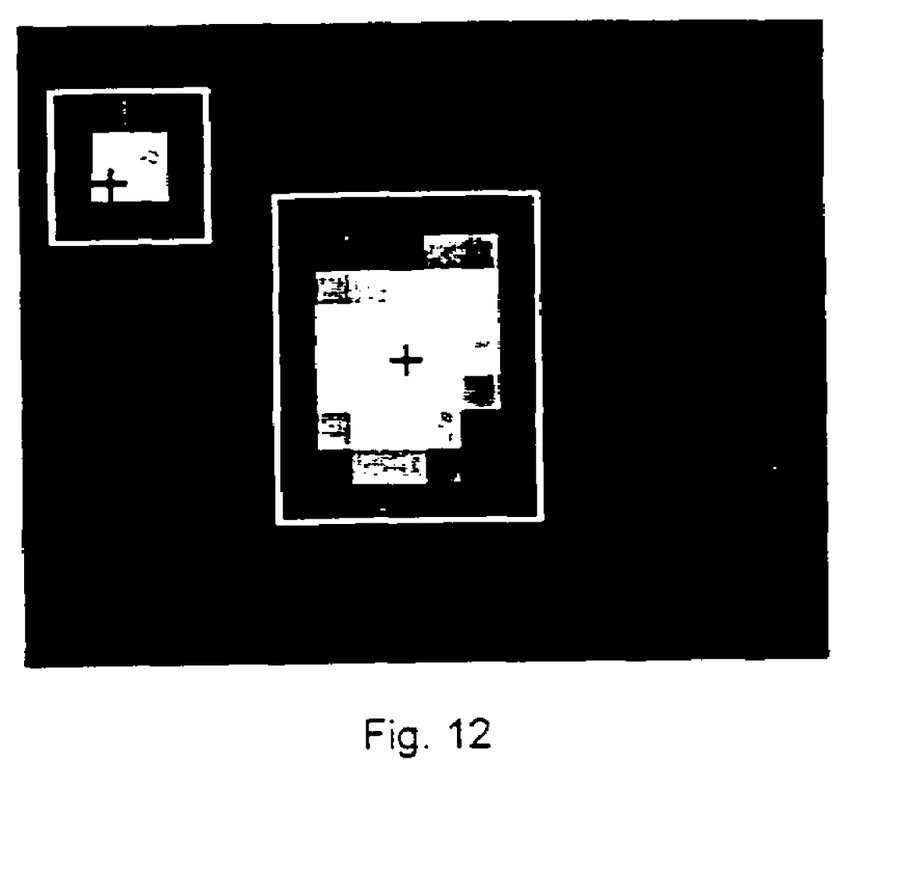
FIG. 12 shows the skin probability map of FIG. 8 along with skin region centroids and bounding boxes.

In the next step, step 140 in FIG. 3, certain statistics are calculated for each skin region. This is achieved by using the skin region map in conjunction with the filtered multi-level skin probability map. More specifically, while the former indicates the different skin regions and the locations of their constituent skin pixels, the latter indicates the skin probability of said skin pixels. In this embodiment, by using both maps, the statistics which are calculated for each skin region are the sum of the skin probabilities of the region's constituent pixels, which will be referred to hereafter as the "power" of the region, the centroid of the region, calculated using the power of the region, and the width and height of the region. Based on the last two, the boundary of the skin region is also identified and a bounding box for each skin region is calculated. Other bounding shapes and/or parameters can also be calculated. As an example, FIG. 12 shows the bounding box and centroid, identified by a cross, for each region of FIG. 11B and the following table is the region information stored.

| Skin Region | Power | Centroid (x, y) | Top-Left & Bottom-Right (x, y) |
|---|---|---|---|
| 1 | 1938 | (2, 4) | (1, 2), (4, 5) |
| 2 | 8344 | (10, 9) | (7, 5), (13, 13) |

Alternatively, the calculation of the statistics may also be performed using only the binary skin region map. This approach, however, will fail to take into account the different skin probabilities of the skin pixels and might result in sub-optimal performance. Employing a multi-level skin probability map instead of relying solely on a binary skin/non-skin map results in improved system performance.

Furthermore, the identification of skin regions may also be achieved based solely on the multi-level skin probability map without thresholding and binarisation, i.e. through the appropriate spatial filtering and connected component analysis of the multi-level map. This approach has the potential of further improving the system's performance, but at a higher computational cost.

The above steps result in identifying those regions in an image that are most likely to be skin. Statistics of those regions of pixels are then extracted and stored as above. This embodiment is concerned with extracting and tracking the face region of the user of the mobile phone and so, as a next step, and for the first frame in a sequence of frames, the skin region having the largest power is selected as the face region. Alternatively, the skin region that is closest to the centre of the image could be selected as the face region or the user could manually select the skin region that is the face region of interest. In other applications, more than one of the skin regions may be selected.

An output of the face detection module is connected to the face tracking module 18. The face tracking module receives and stores the information (power, centroid, bounding box) about the skin regions for each frame. The tracking module uses this information to try and match each region in the current frame to the face region in the preceding frame. In this embodiment, this matching is performed based on a minimum spatial distance rule, where the spatial distance is defined as the maximum axis distance as set out below. In different embodiments other distance measures, such as Euclidean, could be used. In the equations below, $(x_1, y_1)$ denote the centroid of the face region in the previous frame, and $(x_2, y_2)$ denote the centroid of a skin region in the current frame.

$$dx = |x_2 - x_1|$$

$$dy = |y_2 - y_1|$$

maximum axis distance=max (dx, dy)

If the face region of the current frame does not have the highest power among the skin regions for the frame, a hysteresis switching function is activated. If the selected region does not have the highest power for more than ten frames, the tracking is switched to the highest power region. This hysteresis function stabilises the switching between skin regions and stops the flickering between similar regions.

During tracking, the average position of the face may be calculated over a number of frames, and this average position can be used for display of the tracked face. Preferably, the number of frames used in this averaging is controlled by the user, within specified limits, so that the user can affect the smoothness and speed of the tracking. Optionally, when the position of the tracked face moves more than a predetermined displacement threshold from the average position, this averaging is reset.

The camera may include an automatic zoom function, which adjusts the zoom to maintain the dimensions of the tracked face region substantially constant. To avoid flickering, the zoom function may include a hysteresis function, whereby the zoom is adjusted only if a substantial change in the dimensions of the face region is maintained over a certain number of frames.

Aspects of the described embodiment, such as tracking hysteresis, user controlled adjustment of the tracking speed and smoothness, and automatic zooming can be considered as independent aspects of the invention.

In the above embodiment, the invention has been described in the context of a mobile videophone. However, the invention can be used in other applications which involve the detection of skin regions such as security systems and teleconferencing systems. For example, the invention can be used in a security system where one or more faces are simultaneously tracked as part of a person recognition system where individuals are identified and tracked in real time around a building. As another example, the invention could be implemented in a teleconferencing system where several faces are seen and tracked over several frames accurately so that the ordering of the faces is consistent. For example, if there are three faces within the viewing filed and each face is assigned to a button so the viewer can switch between the different faces. A correct correlation between faces must be maintained with the tracking to keep the ordering of the faces consistent. Otherwise when face 3 is selected, for example, it may not be the same face as previously associated with that particular choice.

Although the embodiment is concerned with detecting skin coloured regions, the invention can be used for detecting regions of any predetermined colour or colour distribution.

The above embodiments have been described in relation to mobile video phone communication. The invention may also be used in other applications, such as in video conferencing and transmission of video images from cameras connected to personal computers. The embodiments describe selection of a region including the face of a speaker as an object of interest, but the invention can be applied in relation to any other object of interest. The invention has been described using CIF and QCIF, but other formats may be used. References to certain specific formats include modifications, such as rotations, of those formats. For example, QCIF format has a greater width than height (similar to "landscape" configuration in relation to printing on paper). In the context of a person's face, QCIF format rotated by 90°, that is, so it has greater height than width (like "portrait" configuration), is preferable, so that the face occupies a larger proportion of the selected region and less space is allocated to less important parts of the selected region. Similar considerations apply to the choice of the selected and/or displayed region, with reference to the nature, especially shape, of the object of interest, even if the selected and/or displayed region is not in accordance with specific known formats.

In the embodiment, an image is captured in RGB format as the first colour space and transformed to the LogRG colour space as the second, different, colour space. However, other colour spaces could be used both for image capture and as a secondary colour space. Any colour format can be used, eg YIQ, YUV, RGB, HSI, logarithmic. However, the second colour space should preferably by chosen to suit and enhance the sought colour region. As discussed above, HSI, chromatic and logarithmic colour spaces are among the best for skin regions.

The invention claimed is:

1. A method of detecting at least one region having predetermined colour characteristics in an image, the method comprising:
   transforming colour values of pixels in the image from a first colour space to a second colour space;
   using the colour values in the second colour space to determine probability values expressing a match between pixels and the predetermined colour characteristics, where the probability values ranges over a multiplicity of values;
   using said probability values to identify pixels at least approximating to said predetermined colour characteristics;
   grouping pixels which at least approximate to said predetermined colour characteristics; and
   extracting information about each group;
   wherein pixels are weighted according to the respective multiplicity of probability values, and the weightings are used when grouping the pixels and/or when extracting information about a group.

2. A method as claimed in claim 1, wherein the extracted information includes one or more of the following: power based on the sum of the probabilities of pixels in a group, group area, group size, group location, group centroid, group width, group height, group boundary, group bounding box width, and group bounding box height.

3. A method as claimed in claim 1, further comprising:
   downsampling the image at any stage during its processing.

4. A method as claimed in claim 1, wherein the second colour space enhances said predetermined colour characteristics and achieves robustness to illumination changes.

5. A method as claimed in claim 1, wherein said first colour space is a linear colour space and the second colour space is a non-linear colour space.

6. A method as claimed in claim 1, wherein the second colour space is a logarithmic colour space.

7. A method as claimed in claim 1, using the colour values in the second colour space to determine probability values comprises:
   determining the probability that a pixel has predetermined colour characteristics by projecting its colour value onto a predetermined probability model, said model including an entire histogram or one or more regions of a histogram of the sought colour characteristics.

8. A method as claimed in claim 7, wherein the probability model is calibrated any number of times, either by replacing or merging with the existing probability model, using a sample colour region selected by a user.

9. A method as claimed in claim 7, wherein the probability model is calibrated by extracting a region of an image of a subject.

10. A method as claimed in claim 1, wherein the group of pixels which is most central in the image or has the highest sum of probabilities is selected for display.

11. A method as claimed in claim 1, wherein the image is in a sequence of images, and at least one group of pixels having the predetermined colour characteristics is determined in several images in the sequence.

12. A method as claimed in claim 11, wherein said at least one group of pixels is tracked or displayed though the sequence of images.

13. A method as claimed in claim 12, wherein movements of tracked groups of pixels are averaged over a predetermined number of frames to produce average positions.

14. A method as claimed in claim 13, wherein the number of frames used for the averaging of the movement can be determined by a user within predefined limits.

15. A method as claimed in claim 13, wherein a group movement larger than a predefined limit resets the averaging for that group.

16. A method as claimed in claim 12, wherein each tracked group is assigned an identification tag to enable the tracked groups to be cycled or selected.

17. A method as claimed in claim 12, wherein a user selects the groups for tracking or display.

18. A method as claimed in claim 12, wherein the group which is most central in the image or has the highest sum of probabilities is selected for tracking or display.

19. A method as claimed in claim 18, wherein the tracked or displayed group switches to the group having the highest sum of probabilities when the tracked or displayed group does not have the highest sum of probabilities for a predetermined number of successive images.

20. A method as claimed in claim 11, wherein groups of pixels in different images are matched using a distance or size function.

21. A method as claimed in claim 1, wherein said colour characteristics correspond to human skin colour tones.

22. A method as claimed in claim 1, wherein the at least one region corresponds to a human face.

23. A method as claimed in claim 1, wherein the at least one region corresponds to a human hand.

24. A method as claimed in claim 1, wherein zooming is performed according to the area of a group of pixels in the image.

25. A method as claimed in claim 24, wherein there is a set of discrete zoom levels.

26. A method as claimed in claim 25, further comprising:
   using a temporal hysteresis function to smooth changes between discrete zoom levels.

27. A method of operating a device including an image capture unit, the method comprising:
   identifying groups of pixels in a captured image having predetermined colour characteristics using a method as claimed in claim 1.

28. A method as claimed in claim 27, further, comprising:
   extracting one or more regions containing said groups of pixels for further processing.

29. A method as claimed in claim 28, wherein the further processing includes displaying the extracted regions on an image display unit.

30. A method as claimed in claim 27, wherein the device is utilized in an image transmission system.

31. A computer program stored on a computer readable media for executing a method as claimed in claim 1.

32. An apparatus for detecting at least one region having predetermined colour characteristics in an image, the apparatus comprising:
   a signal processor configured to
      transform colour values of pixels in the image from a first colour space to a second colour space;

use the colour values in the second colour space to determine probability values expressing a match between pixels and the predetermined colour characteristics, where the probability values ranges over a multiplicity of values;

use said probability values to identify pixels at least approximating to said predetermined colour characteristics;

group pixels which at least approximate to said predetermined colour characteristics; and extract information about each group;

wherein pixels are weighted according to the respective multiplicity of probability values, and the weightings are used when grouping the pixels or when extracting information about a group.

33. An apparatus as claimed in claim 32, further comprising:

a data storage unit: and an image data processing unit.

34. A transmitter for a communication system comprising an apparatus as claimed in claim 32 or claim 33.

35. An apparatus as claimed in claim 32, wherein the apparatus is a mobile videophone.

36. An apparatus for detecting at least one region having predetermined colour characteristics in an image, the apparatus comprising:

means for transforming colour values of pixels in the image from a first colour space to a second colour space;

means for using the colour values in the second colour space to determine probability values expressing a match between pixels and the predetermined colour characteristics, where the probability values ranges over a multiplicity of values;

means for using said probability values to identify pixels at least approximating to said predetermined colour characteristics;

means for grouping pixels which at least approximate to said predetermined colour characteristics; and means for extracting information about each group;

wherein pixels are weighted according to the respective multiplicity of probability values, and the weightings are used when grouping the pixels or when extracting information about a group.

* * * * *

UNITED STATES PATENT AND TRADEMARK OFFICE
CERTIFICATE OF CORRECTION

PATENT NO.       : 7,236,629 B2                                    Page 1 of 1
APPLICATION NO.  : 10/408316
DATED            : June 26, 2007
INVENTOR(S)      : James Cooper et al.

It is certified that error appears in the above-identified patent and that said Letters Patent is hereby corrected as shown below:

Please change the Foreign Application Priority Data from "Apr. 18, 2002" to --Apr. 8, 2002--.

Signed and Sealed this

Twenty-fourth Day of June, 2008

JON W. DUDAS
*Director of the United States Patent and Trademark Office*